United States Patent
Cain, III et al.

(10) Patent No.: US 7,818,722 B2
(45) Date of Patent: *Oct. 19, 2010

(54) COMPUTER IMPLEMENTED METHOD AND SYSTEM FOR ACCURATE, EFFICIENT AND ADAPTIVE CALLING CONTEXT PROFILING

(75) Inventors: Harold Wade Cain, III, Hartsdale, NY (US); Jong-Deok Choi, Mount Kisco, NY (US); Mauricio Jose Serrano, Bronx, NY (US); Xiaotong Zhuang, Quincy, MA (US)

(73) Assignee: International Business Machines Corporation, Armonk, NY (US)

( * ) Notice: Subject to any disclaimer, the term of this patent is extended or adjusted under 35 U.S.C. 154(b) by 1167 days.

This patent is subject to a terminal disclaimer.

(21) Appl. No.: 11/450,656

(22) Filed: Jun. 9, 2006

(65) Prior Publication Data
US 2007/0288908 A1    Dec. 13, 2007

(51) Int. Cl.
*G06F 9/44* (2006.01)
(52) U.S. Cl. .................. 717/130; 717/127; 717/128; 717/131; 717/133
(58) Field of Classification Search ......... 717/130–133, 717/158, 148, 151, 153–155, 157, 127, 128; 711/132; 712/245; 714/E11.2
See application file for complete search history.

(56) References Cited

U.S. PATENT DOCUMENTS

| 5,023,828 | A | * | 6/1991 | Grundmann et al. | ........ 712/245 |
| 5,357,623 | A | * | 10/1994 | Megory-Cohen | ........... 711/129 |
| 5,524,247 | A | * | 6/1996 | Mizuno | ...................... 710/200 |

(Continued)

OTHER PUBLICATIONS

TitleL.Selective guarded execution using profiling on a dynamically scheduled processor, author: Mantripragada, S.et al; source: IEEE, publication date: 1999.*

(Continued)

*Primary Examiner*—Chameli C Das
(74) *Attorney, Agent, or Firm*—Yee & Associates, P.C.; Derek S. Jennings

(57) ABSTRACT

Computer implemented method, system and computer usable program code for profiling the execution of an application that is both space- and time-efficient and highly accurate. A computer implemented method for profiling the execution of an application includes sampling execution characteristics of the application at a plurality of sampling points to provide samples, and deriving a calling context of the samples. The application is continuously executed between sampling points while additional profiling data is gathered.

1 Claim, 6 Drawing Sheets

U.S. PATENT DOCUMENTS

| | | | |
|---|---|---|---|
| 5,603,006 A * | 2/1997 | Satake et al. | 711/132 |
| 5,909,578 A | 6/1999 | Buzbee | |
| 6,012,087 A * | 1/2000 | Freivald et al. | 709/218 |
| 6,081,665 A * | 6/2000 | Nilsen et al. | 717/116 |
| 6,658,652 B1 * | 12/2003 | Alexander et al. | 717/128 |
| 6,662,358 B1 * | 12/2003 | Berry et al. | 717/128 |
| 6,851,109 B1 * | 2/2005 | Alexander et al. | 717/148 |
| 6,857,120 B1 | 2/2005 | Arnold et al. | |
| 6,971,091 B1 | 11/2005 | Arnold et al. | |
| 7,178,132 B2 * | 2/2007 | Pierce | 717/127 |
| 7,293,259 B1 * | 11/2007 | Dmitriev | 717/130 |
| 7,293,260 B1 * | 11/2007 | Dmitriev | 717/130 |
| 7,343,598 B2 * | 3/2008 | Chilimbi et al. | 717/158 |
| 7,688,727 B1 * | 3/2010 | Ferguson et al. | 370/230.1 |
| 2004/0083460 A1 * | 4/2004 | Pierce | 717/131 |
| 2004/0103408 A1 * | 5/2004 | Chilimbi et al. | 717/140 |
| 2005/0034105 A1 | 2/2005 | Hind et al. | |
| 2005/0091645 A1 | 4/2005 | Chilimbi et al. | |
| 2005/0155019 A1 * | 7/2005 | Levine et al. | 717/127 |
| 2008/0189687 A1 * | 8/2008 | Levine et al. | 717/128 |

OTHER PUBLICATIONS

Title: Dynamic Impact Analysis Using Execution Profile Tracing, author: Huang, L et al, source: IEEE, publication date: 2006.*
Title: Extracting fine-grain profiles of in-order executions of instruction level parallel programs, author: Zingirian, N.et al, source: IEEE, publication date: 2000.*

* cited by examiner

FIG. 3A
CALL SEQUENCE:
-'->': method call,'<-': method return, '(A)' : 'A' is top-of-stack
- A->B->C->E, <-,(C)->E, <,<-,<-,(A)->D->C,<-,<-,(A)->B->C->E,<-,(C)->E,
  <-,<-,<-,(A)->D->C,->A,<-,<-,<-,(A)
FIG. 3B
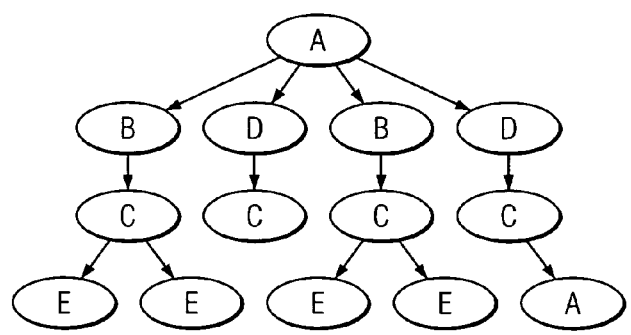
FIG. 3C
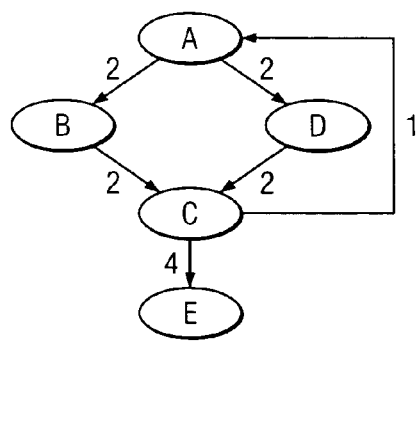
FIG. 3D
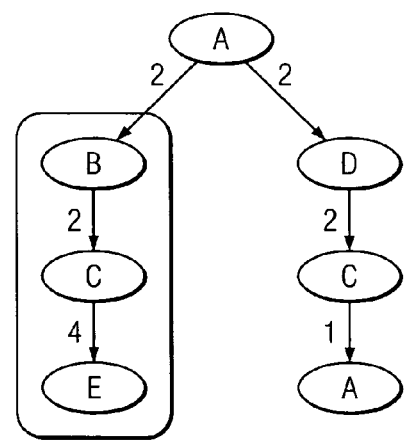

COMPUTER IMPLEMENTED METHOD AND SYSTEM FOR ACCURATE, EFFICIENT AND ADAPTIVE CALLING CONTEXT PROFILING

BACKGROUND OF THE INVENTION

1. Field of the Invention

The present invention relates generally to the data processing field and, more particularly, to a computer implemented method, system and computer usable program code for profiling the execution of an application.

2. Description of the Related Art

Calling context profiles are used in many interprocedural code optimizations and as an aid in overall program understanding. Collecting profile information, however, is highly intrusive due to the high frequency of method calls in most applications. Current calling context profiling mechanisms consequently suffer from low accuracy, high overhead, or both.

Given a trace containing all method calls and returns, calling context tree construction is relatively straightforward. Initially, a root node is added to the tree, and a cursor pointer is maintained that points to the current method context, initialized to the root node. If a method call is encountered, the node's children are compared to the new callee. If a matching child is found, the weight of the edge onto the child is incremented. If no child matches the callee, a new child is created. The cursor is then moved to the callee method. If a return is seen, the cursor is moved back one level to the parent. In the case of multi-threaded applications, a cursor is needed per thread.

Although this approach, generally referred to herein as the "exhaustive" approach, builds a complete calling context tree (CCT), the procedure suffers from severe performance degradation due to tracing overhead. Experiments have shown that tracing overhead can cause a very significant slowdown since each and every method call and return must be instrumented.

Sampled stack-walking is one alternative to the above-described "exhaustive" approach. Specifically, since a cursor pointer cannot be maintained across samples, the current context is determined at each sampling point by performing a stack-walk from the current method to the root method; and adding this path to the CCT if necessary. If the CCT already contains this path, the edge weight between the top two methods on the stack is incremented. Since the sampling rate can be controlled, profiling overhead can be easily minimized, however, this is achieved at the cost of accuracy.

In general, the accuracy of the sampled stack-walking approach suffers for two principal reasons. Initially, because individual method calls are not observed but are inferred, the collected CCT results may be inaccurate and misleading. For example, a program may spend most of its time executing within a single method. The sampled stack-walking approach, however, will assume that the method's caller is making frequent calls to the method because it is always on top of the stack. Consequently, the CCT obtained with this approach reflects execution time spent in each context more than the method invocation frequency of each context.

Secondly, increasing accuracy by increasing the sampling rate can be costly because of the generally high overhead of the interrupt mechanism to trigger a sampled stack-walking. Furthermore, supporting high sampling rates may not even be feasible on systems whose timer resolution is limited. As will be explained hereinafter, both the degree of overlap and the hot-edge coverage for the sampled stack-walking are typically below 50 percent.

It would, accordingly, be desirable to provide a mechanism for profiling the execution of an application that is both space- and time-efficient and highly accurate.

SUMMARY OF THE INVENTION

Exemplary embodiments provide a computer implemented method, system and computer usable program code for profiling the execution of an application. A computer implemented method for profiling the execution of an application includes sampling execution characteristics of the application at a plurality of sampling points to provide samples, and deriving a calling context of the samples. The application is continuously executed between sampling points while additional profiling data is gathered.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of exemplary embodiments when read in conjunction with the accompanying drawings, wherein:

FIG. 3A illustrates a call sequence, and FIGS. 3B, 3C and 3D schematically illustrate a call tree, a call graph and a calling-context tree corresponding to the call sequence to assist in explaining exemplary embodiments;

DETAILED DESCRIPTION OF THE PREFERRED EMBODIMENT

Figure 1:
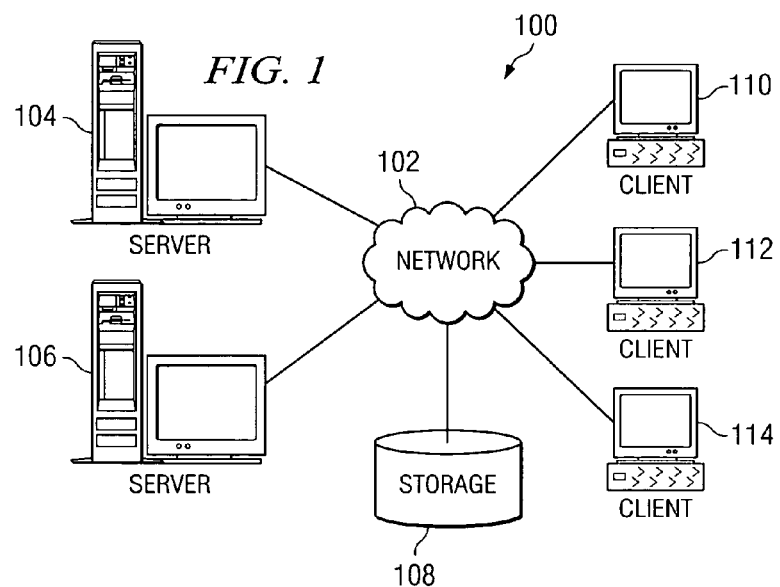
FIG. 1 depicts a pictorial representation of a network of data processing systems in which exemplary embodiments may be implemented.
Figure 2:
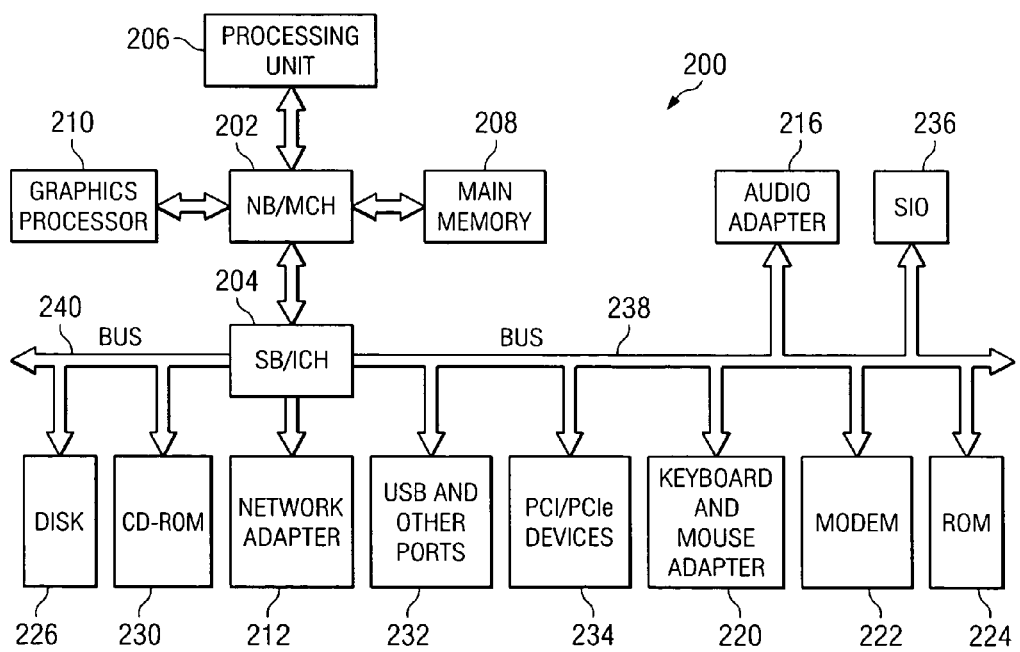
FIG. 2 is a block diagram of a data processing system in which exemplary embodiments may be implemented.

With reference now to the figures and in particular with reference to FIGS. 1-2, exemplary diagrams of data processing environments are provided in which exemplary embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which exemplary embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which exemplary embodiments may be implemented. Data processing system 200 is an example of a computer, such as server 104 or client 110 in FIG. 1, in which computer usable code or instructions implementing the processes may be located for the exemplary embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200 (Java™ and all Java™-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the exemplary embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the exemplary embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide a computer implemented method, system and computer usable program code for profiling the execution of an application that is both space- and time-efficient and highly accurate. Principles of exemplary embodiments as described herein may be applicable to any run-time environment such as Virtual Machines, Just-in-Time compilers, and the like.

In general, a program may have multiple calling structures for representing different executions of a program. For example, if the behavior of a program is dependent on its input, then for different inputs, different calling structures may evolve. According to exemplary embodiments, there are defined principal data structures that represent calling relationships among a program's methods. The principal data structures are the call tree, the call graph, the calling context tree (CCT), and the call stack (CS).

FIG. 3A illustrates a call sequence, and FIGS. 3B, 3C and 3D schematically illustrate a call tree, a call graph and a calling-context tree corresponding to the call sequence to assist in explaining exemplary embodiments. As shown in FIG. 3B, the call tree has a node for each time a method is invoked, and an edge between a pair of nodes for each time a call between the corresponding methods in the program occurs in the program's execution. This data structure captures the order in which methods are invoked.

The call graph illustrated in FIG. 3C is a graph in which nodes represent methods and edges represent call sites and their target. Since object-oriented languages support polymorphic calls, a call site may have multiple targets. Each target at a call site is identified by a call graph edge.

The calling context tree illustrated in FIG. 3D is a rooted tree of call graph paths, such that any path is only represented once. Paths with common prefixes may share the corresponding nodes and edges in the CCT. Thus, unlike the call graph of FIG. 3C, and like the call tree of FIG. 3B, the CCT may have many nodes that represent a method, one node for each calling context in which that method is invoked. But unlike the calling tree, a node in the CCT may represent multiple invocations of the corresponding method.

Each of the graphs illustrated in FIGS. 3B-3D makes a trade-off between space and precision, which corresponds to the level of detail about the program's execution that is captured. In general, the call tree is expensive, requiring one node per each method call. The call graph requires less space but is imprecise in that one cannot tell whether B or D is more responsible for the frequent calls of E by C. The CCT is not as expensive as the call tree, and on the CCT it is clear that B->C->E is the most expensive call path. The CCT, however, also makes a trade-off between space and precision by not capturing the order in which methods are invoked.

The call graph and the CCT data structures above may have a weight associated with each edge (or each node), representing the execution frequency of that edge (or that node). That is, since an edge in the call graph and CCT may represent multiple calls, an edge in these graphs may be annotated with a number indicating the number of calls that the edge represents as shown in FIGS. 3C and 3D.

A call stack, CS, is a thread-specific runtime data structure that keeps track of the methods that are currently active in a thread. Each active method is represented by a frame in the call stack. In the present description, it is assumed that the stack grows in a downward fashion, i.e., the most recent stack frame for newly called methods is at the bottom of the stack and the least recent frame is at the top. In operation, for example, if a method A calls method B which calls method C, the call stack before C returns will contain (from top to bottom) a stack frame for A, a stack frame for B, and a stack frame for C. Each stack frame (also referred to as an activation record) includes three pieces of information: the name of the method whose execution this stack frame represents; a pointer to the stack frame of the calling method; and, the values of the arguments that are passed. It is understood that other information may also be maintained in a stack frame, including, for example, the return address of the calling method, i.e., an instruction in the calling method that occurs after the branch to the callee. In the example above, the stack frame for C would have a stack frame pointer to B's frame, and B would have a stack frame pointer to A's frame. Most processors have a dedicated stack frame register which points to the last stack frame that was created. In the example described above, the stack frame register would be pointing to the stack frame for method C, when execution is in C.

Figure 4A:
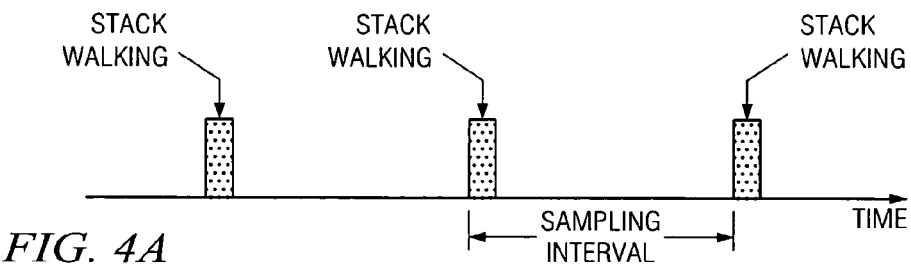
FIGS. 4A and 4B are diagrams that schematically illustrate sampled stack-walking and sampled bursting procedures, respectively, to assist in explaining exemplary embodiments.
Figure 4B:
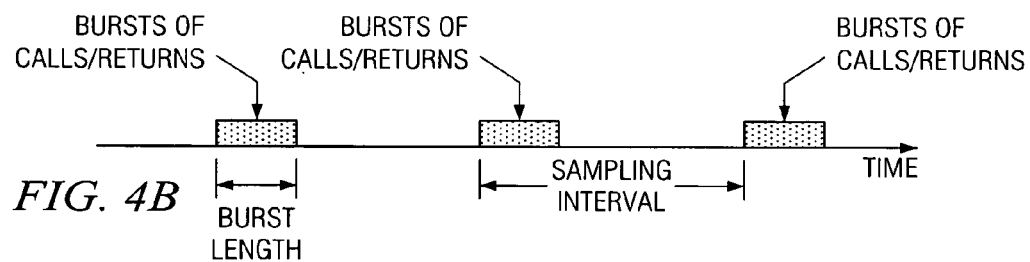

Previous sampling-based approaches include "sampled stack-walking" and "sampled bursting" procedures. FIGS. 4A and 4B are diagrams that schematically illustrate sampled stack-walking and sampled bursting procedures, respectively, to assist in explaining exemplary embodiments. In sampled bursting, illustrated in FIG. 4B, a finite continuous burst of method call/return traces is generated at each sampling point. In sampled stack-walking, illustrated in FIG. 4A, the full stack is walked back at each sampling point. As described previously, these sampling-based approaches are generally not fully satisfactory because they tend to be both costly and inaccurate.

Exemplary embodiments provide a mechanism for profiling the execution of an application that is both space- and time-efficient and highly accurate. In general, exemplary embodiments profile the execution of an application by taking a sample, recognizing the context of the sample and continuing execution of the application while gathering additional data about future steps in the execution of the application, which will be interpreted using the recognized context. According to one exemplary embodiment, the sampled stack-walking and sampled bursting procedures described above are combined. The resulting approach, referred to herein as "static bursting" improves the accuracy of bursting because stack-walking gives the context for the bursts of method calls/returns.

Figure 5:
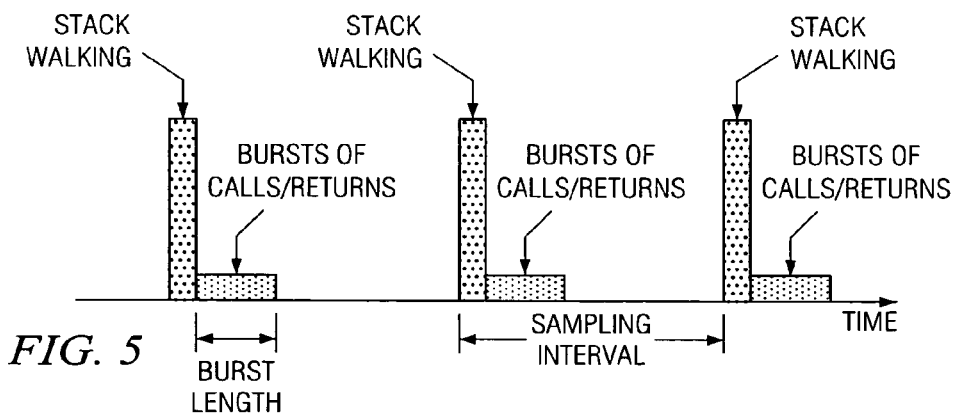
FIG. 5 is a diagram that schematically illustrates a combined sampled stack-walking with bursting according to an exemplary embodiment.

FIG. 5 is a diagram that schematically illustrates a combined sampled stack-walking with bursting according to an exemplary embodiment. In static bursting, similar to the sampling-based approach, a bursting profiler allows an application to run unhindered between sampling points; and, at each sampling point, the stack is walked to determine the current calling context. However, rather than increment an edge weight based on this stack sample (which may not reflect actual method invocation), the exhaustive approach is used to collect a "burst" of call/return samples for a designated interval, referred to as the "burst length" (BL). Performing bursting alone at each sampling point, without a stack-walk, would result in a low accuracy CCT. Because the calling context at the beginning of the burst would be unknown, it would be difficult to determine where to update the CCT. By combining sampled stack-walking with bursting, the accuracy of bursting is improved because the stack-walk gives the context for the bursts of method calls/returns.

Although CCT accuracy is dramatically improved when using the static bursting approach, the approach still introduces significant overhead due to the intrusiveness of each burst. According to a further exemplary embodiment, a profiling mechanism referred to herein as "adaptive bursting" is provided that achieves the accuracy of static bursting while minimizing overhead.

In general, adaptive bursting further improves performance by:
1) Suppressing and sampling bursting when stack contexts are identical;
2) Sample bursting in a stochastic way to improve efficiency of the sample bursting; and
3) Say that the stochastic re-enable ratio (RR) is 1/N. Then, some of the identical stack contexts are re-enabled with re-enable ratio 1/N, and the weight of the re-enabled bursts is multiplied by N.

Figure 6:
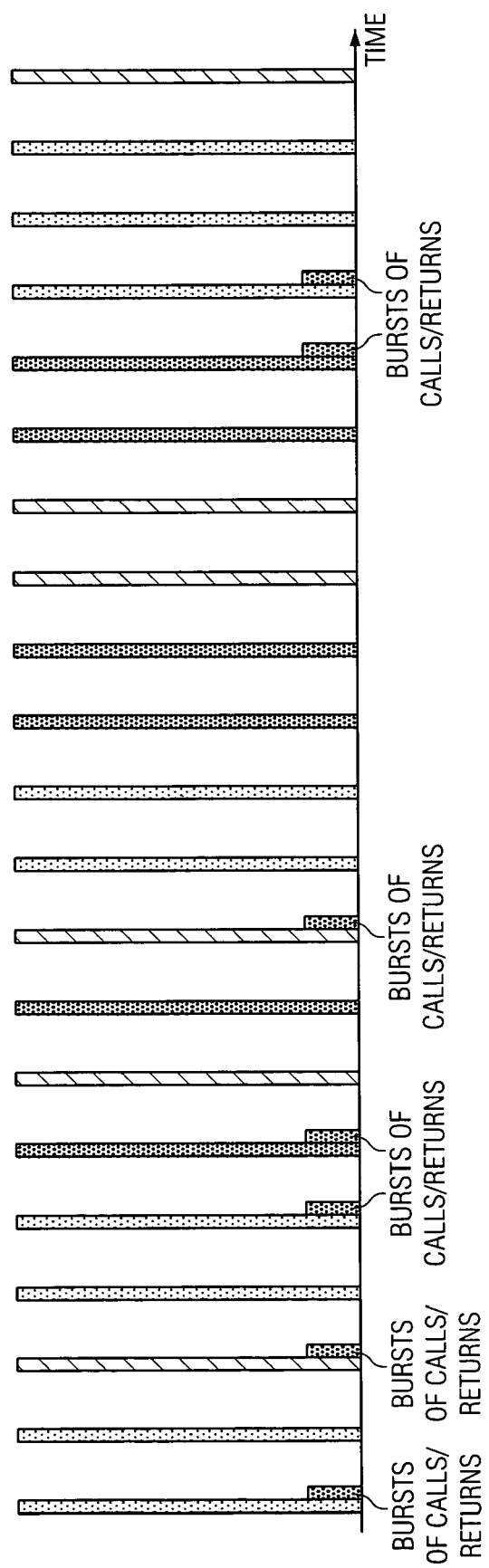
FIG. 6 is a diagram that schematically illustrates adaptive bursting according to an exemplary embodiment.

FIG. 6 is a diagram that schematically illustrates adaptive bursting according to an exemplary embodiment. In the illustrated example, with RR=⅓, on average, only one method-call burst occurs out of three stack-walks (7 bursts in 21 sampling intervals) with identical stack signatures. In FIG. 6, different hatching or shading represents different signatures. The weight of each burst will be 3 (1/RR).

Figure 7:
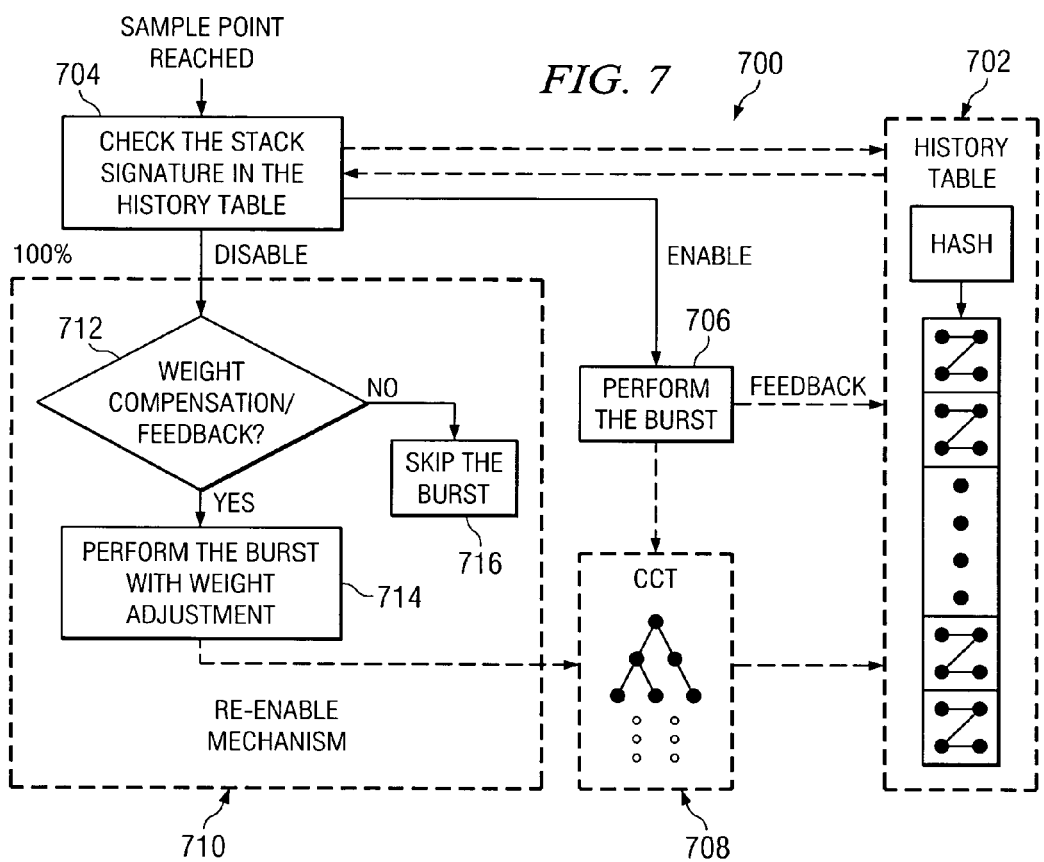
FIG. 7 is a block diagram that schematically illustrates an adaptive bursting mechanism according to an exemplary embodiment.

FIG. 7 is a block diagram that schematically illustrates an adaptive bursting mechanism, generally designated by reference number 700, according to an exemplary embodiment. Because application control flow is highly repetitive, it is no surprise that static bursting will collect much redundant information. Adaptive bursting reduces this overhead by selectively disabling bursts for previously sampled calling contexts, thus reducing redundant samples due to repetitive code sequences. Unfortunately, permanently disabling bursting for certain contexts leads to two problems: 1) as run-time behaviors periodically change, new calling patterns will be lost from the calling context tree, and 2) by disabling bursting for common control flow, CCT edge-weights become skewed as hot-code paths are sampled with the same frequency as rare code paths.

Adaptive bursting mechanism 700 according to an exemplary embodiment addresses these problems through probabilistic burst re-enablement and edge-weight compensation. In particular, as shown in FIG. 7, with respect to burst re-enablement, bursting is adaptively enabled/disabled based on history information stored in software-implemented history table 702, and the adaptive re-enable ratio (RR). At each sampling point, history table 702 is indexed using a signature constructed using the run-time stack as shown at 704. If no table entry with the matching signature exists, a new entry is created and a burst is initiated as shown at 706 to provide CCT 708. However, if a matching entry is found, re-enablement mechanism 710 is provided to generate a random number $0 \leq n \leq 1$ using weight compensation/feedback as shown at 712. If $n \leq RR$, a burst is performed (the burst is performed with weight adjustment as shown at 714). Otherwise, no burst is performed (the burst is skipped) as shown at 716 to provide CCT 708.

Figure 8:
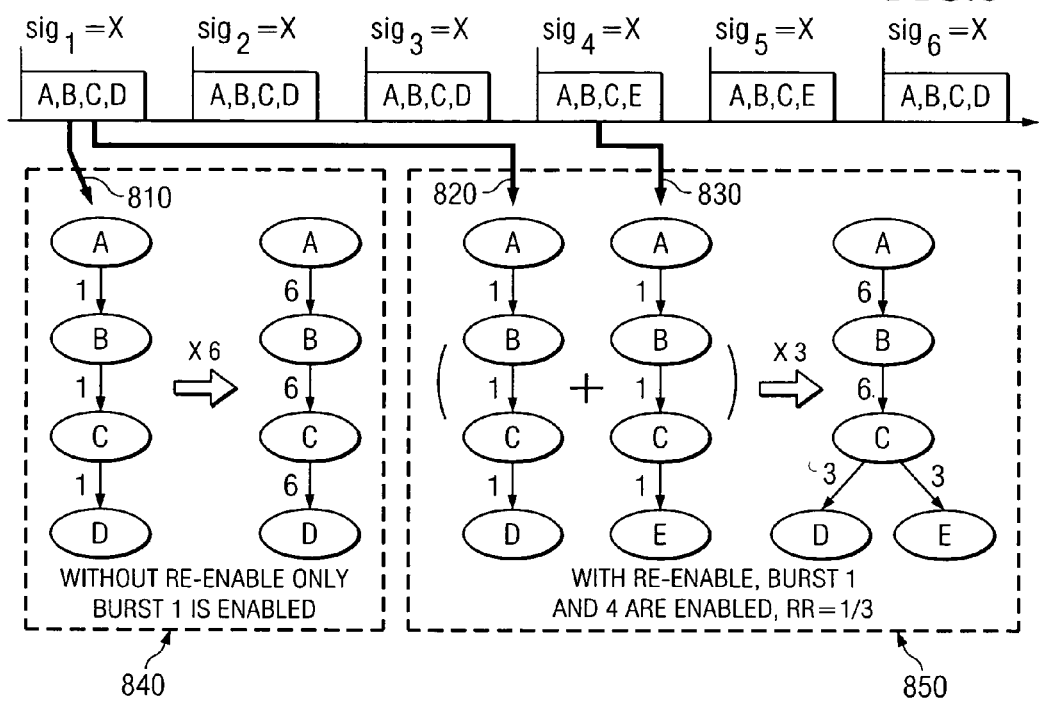
FIG. 8 is a diagram that illustrates weight compensation according to an exemplary embodiment.

FIG. 8 is a diagram that schematically illustrates the effect of the weight compensation operation performed by weight compensation mechanism 714 in FIG. 7 according to an exemplary embodiment. As shown, without re-enable, only the first burst is enabled as shown by arrow 810, resulting in CCT 840. With re-enable, on the other hand (RR set equal to 1/3), the first burst and the fourth burst are enabled as shown by arrows 820 and 830 resulting in CCT 850.

Intuitively, the runtime stack contains all methods that are currently on the stack, all parameters being passed, and values of local variables. This information can give a great deal of information regarding the current state of the program's execution. This information, however, must be distilled into a concise signature that can be computed at low cost while also being well distributed. According to a further exemplary embodiment, a variation of the CRC (cyclic redundancy check) is computed using the address of each method and call site on the stack. Although overhead could be controlled by manipulating sampling rate, the fundamental advantage added by this history-based mechanism is its favoritism of bursting for those calling contexts whose signatures have not been previously observed. Given a fixed bursting rate, this favoritism increases the number of unique calling contexts for which bursting will be enabled.

As mentioned previously, permanently disabling bursting for a particular calling context is undesirable because this skews CCT edge-weights by decreasing the relative weight of hot edges and increasing the relative weight of cold edges. Also, because the calling context signature is approximate, it is possible that the same signature may represent two different calling contexts.

According to an exemplary embodiment, in order to maintain an accurate distribution of edge-weights, RR is again used for weight compensation. As described previously, at each sampling point, a random number $0 \leq n \leq 1$ is generated to determine whether bursting needs to be re-enabled (i.e., whether $n \leq RR$). If it is determined that a burst should be re-enabled, RR is used to perform weight compensation by multiplying every counter value added to the CCT by 1/RR.

For example, if RR is set to 0.25, i.e., 25% of the bursts are selectively enabled whose history table entries indicate that they should be disabled. Consequently, the edge weights incremented to the CCT during each enabled burst are multiplied by 4. Intuitively, only one burst is enabled for every four bursts that are skipped. Therefore, the weights should be four times larger.

As an example, as shown at 850 in FIG. 8, RR is set equal to 1/3. Thus, burst 4 is re-enabled and the call from C to E can be captured. The CCT shown at 850 in FIG. 8 is, therefore, more accurate than the CCT shown at 840 in FIG. 8. For those calling context signatures that are not disabled according to the history table, this multiplication by 1/RR is not performed because their weights do not need to be compensated.

The value of RR reflects the trade-off between accuracy and overhead. A higher RR causes more bursts to be re-enabled, adding higher overhead, whereas a smaller RR could miss more bursts and lowers the quality of the CCT.

Various hash functions are used to efficiently compute and represent the stack signatures. The selection of the hash function must consider several issues. It should not incur a high cost since hashing is done at each sampling point. The hashing result should be well distributed to reduce ambiguity. Also, it should fairly well represent methods on the stack.

One method is to use a variation of the CRC. Suppose the stack trace is stored in an array k[ ] with M elements, the hash is calculated as follows:

```
for (int k = 0, highorder; k< N; k++) {
    Highorder = h & 0xF8000000;
    H = h << 5;
    H = h ^ (highorder >> 27);
    H = h ^ K[i];
}
```

Another method is to use the size of the stack, computed as the difference between the address of the top-of-the-stack (TOS) and the address of the bottom-of-the-stack (BOS), to further differentiate ambiguous cases where the stack difference is the same. This method can be refined by adding a hash signature which contains the addresses of several TOS method addresses.

The result of the hashing is used to select an entry which will be examined and updated at a later stage. The results of the hash lookup are used to disable similar bursts, since they may not contribute significantly to edge coverage in the CCT.

According to a further exemplary embodiment, a profiling mechanism referred to as "partial CCT construction" is provided. This approach is based on the full CCT approach, but performs only partial stack-walking, whose depth is determined by stack-walk height (SH). In addition to SH, the following three parameters which are fixed values in the previous description are also dynamically adjusted: sampling interval (SI), burst length (BL) and re-enable ratio (RR). This partial CCT construction thereby allows the trading-off between profiling cost and the accuracy of the CCT, which makes the approach very well suited for dynamic optimizations, such as Java's just-in-time (JIT) optimization.

Figure 9:
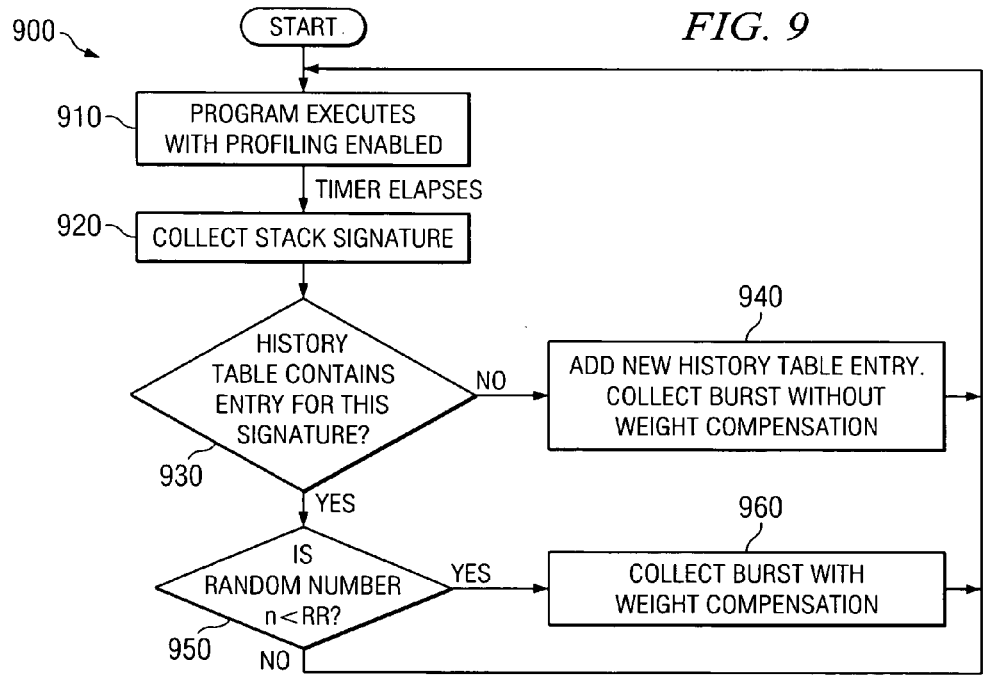
FIG. 9 is a flowchart that illustrates a method for profiling the execution of an application according to an exemplary embodiment.

FIG. 9 is a flow chart that illustrates a method for profiling the execution of an application according to an exemplary embodiment. The method is generally designated by reference number 900, and begins by executing a program with profiling enabled (Step 910). After a timer elapses, a stack signature is collected (Step 920), and a determination is made if a history table contains an entry for the collected signature (Step 930). If the history table does not contain an entry for the collected signature (No output of Step 930), a new history table entry is made, and a burst is collected without weight compensation (Step 940). The method then returns to Step 910.

If the history table does contain an entry for the collected signature (Yes output of Step 930), a determination is made whether random number n is less than the re-enable ratio (RR) (Step 950). If the random number is less than the re-enable ratio (Yes output of Step 950), a burst is collected with weight compensation (Step 960), and the method returns to Step 910. If the random number is not less than the re-enable ratio (No output of Step 950), the method returns to Step 910.

Exemplary embodiments thus provide a computer implemented method, system and computer usable program code for profiling the execution of an application. A computer implemented method for profiling the execution of an application includes sampling execution characteristics of the application at a plurality of sampling points to provide samples, and deriving a calling context of the samples. The application is continuously executed between sampling points while additional profiling data is gathered.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for profiling the execution of an application, the computer implemented method comprising:

sampling execution characteristics of the application at a plurality of sampling points to provide samples;

deriving a calling context of the samples by performing partial stack walking between a top of the stack and a root of the stack to collect a stack signature at each of the plurality of sampling points, wherein the stack signature is constructed using data residing on the stack, and wherein performing partial stack walking comprises walking a subset of the stack, and wherein the subset of the stack is less than the entire stack;

determining whether a history table contains an entry for a collected stack signature;

responsive to a determination that the history table does not contain an entry for the stack signature, adding a new history table entry and collecting a burst without weight compensation;

responsive to a determination that the history table does contain an entry for the stack signature, determining whether a random number is less than a predetermined re-enablement ratio;

responsive to a determination that the random number is less than a predetermined re-enablement ratio collecting a burst with weight compensation;

responsive to a determination that the random number is not less than a predetermined re-enablement ratio skipping the burst; and continuously executing the application between sampling points while gathering additional profiling data, wherein the application executes with profiling enabled.

\* \* \* \* \*